United States Patent [19]

Taylor et al.

[11] Patent Number: US 6,166,166 B1

[45] Date of Patent: Dec. 26, 2000

[54] COMPOSITION AND PROCESS FOR PREPARATION OF THERMOPLASTIC POLYURETHANES (TPU BASED ON A POLYBUTADIENE SOFT SEGMENT)

[75] Inventors: Ronald P. Taylor, Moon Township; Jack C. Chan, Coraopolis; Karl W. Haider, McKees Rocks, all of Pa.; E. Haakan Jonsson, Cologne, Germany; Uli W. Franz; Mark A. Peters, both of Moon Township, Pa.

[73] Assignee: Bayer Corporation, Pittsburgh, Pa.

[21] Appl. No.: 09/140,208

[22] Filed: Aug. 26, 1998

[51] Int. Cl.[7] .......................... C08G 18/62; C08G 18/10; C08G 18/32

[52] U.S. Cl. .................. 528/65; 264/210.2; 264/211.12; 264/211.2; 264/211.21; 264/211.23; 264/212; 264/216; 264/540; 528/75; 528/85

[58] Field of Search ............................ 264/210.2, 211.12, 264/211.2, 211.21, 211.23, 212, 216, 540; 528/65, 75, 85

[56] References Cited

U.S. PATENT DOCUMENTS

| | | | |
|---|---|---|---|
| 5,066,762 | 11/1991 | Ohbuchi et al. | 528/85 |
| 5,247,023 | 9/1993 | Chung et al. | 525/288 |
| 5,403,904 | 4/1995 | Nubel et al. | 526/139 |
| 5,512,635 | 4/1996 | Nubel et al. | 525/247 |
| 5,519,101 | 5/1996 | Nubel et al. | 526/142 |
| 5,545,707 | 8/1996 | Heidingsfeld et al. | 528/60 |
| 5,559,190 | 9/1996 | Nubel et al. | 525/270 |
| 5,589,543 | 12/1996 | Yokelson et al. | 525/131 |
| 5,589,548 | 12/1996 | Nubel et al. | 525/247 |
| 5,731,383 | 3/1998 | Nubel et al. | 525/297 |
| 5,750,815 | 5/1998 | Grubbs et al. | 585/511 |
| 5,762,944 | 6/1998 | Inoue et al. | 523/112 |

FOREIGN PATENT DOCUMENTS

| | | |
|---|---|---|
| 592668 | 4/1994 | European Pat. Off. . |
| 796899 | 9/1997 | European Pat. Off. . |
| 914825 | 3/1959 | United Kingdom . |

OTHER PUBLICATIONS

Oertel; *Polyurethane Handbook: Chemistry–Raw Materials–Processing–Applications–Properties*; Hanser Publishers; New York; 1985; pp. 405–417.

Frisch et al, "Polyurethane Elastomers Based Upon Novel Hydrocarbon–Based Diols" Cellular Polymers, vol. 15, No. 6, 1996, pp. 395–416, XP000678752, Shawbury, Shrewsbury, UK.

Frisch et al., Cell. Polym., 1996, 15(6), 1996, pp. 395–416.

*Primary Examiner*—Rabon Sergent
*Attorney, Agent, or Firm*—Joseph C. Gil; N. Denise Brown

[57] ABSTRACT

A process for making a thermoplastic polyurethane material comprising the steps of casting an NCO-terminated prepolymer with 1,4-butanediol to form a casting composition; extruding the casting composition to form at least one strand of a polyurethane elastomer; pelletizing the at least one strand of said polyurethane elastomer to form at least one pellet; and processing the at least one pellet to form a thermoplastic article.

17 Claims, No Drawings

COMPOSITION AND PROCESS FOR PREPARATION OF THERMOPLASTIC POLYURETHANES (TPU BASED ON A POLYBUTADIENE SOFT SEGMENT)

BACKGROUND OF THE INVENTION

Polyurethanes based on polybutadiene soft segments with a functionality of 2.0 are disclosed in Yokelson. et al. (U.S. Pat. No. 5,589,543). Yokelson. et al., however, does not disclose the use of polyurethanes as thermoplastics. Commercial hydroxy terminated polybutadienes are used to formulate various polyurethane casting resins and binders. However, since these polybutadienes have functionalities greater than 2.0, they form thermoset polyurethane materials. Polyurethanes based on these polybutadienes cannot be processed as thermoplastics (extrusion or injection molding processes). Hydroxy-terminated polybutadienes having a functionality of 2.0 are disclosed in Chung. et al. (U.S. Pat. No. 5,247,023), Grubbs. et al. (U.S. Pat. No. 5,750,815) and Nubel. et al. (U.S. Pat. Nos. 5,512,635, 5,559,190, 5,519,101 and 5,403,904). However, these polybutadienes, have not been used to make a thermoplastic polyurethane material.

Polyurethane elastomers made from polybutadiene diols having a functionality of 2 are disclosed as being manufactured by making a toluene diisocyanate (TDI) prepolymer of the polybutadiene diol, blending in methylene bis-ortho chloroaridine (MbOCA) then curing the mixture by compressing it under elevated temperature and pressure. Additionally, such elastomers are disclosed as being made from a one-shot procedure, by blending 1,4-butanediol with the polybutadiene diol, adding molten diphenyl-methyl diisocyanate (MDI) and compressing the reaction mixture under elevated temperature and pressure, Frisch. et al., *Cell Polym* 1996, 15(6), 395. However, it has been found that polyurethanes cast from mixtures of MDI, a polybutadiene diol, and 1,4 butanediol, by the prepolymer process have very poor initial mechanical properties. Even after extended post-cure at elevated temperature (18 h, 110° C.), the polymers are not sufficiently tough to be cut and tested for mechanical properties. However, we have surprisingly found that extruding the cast materials leads to marked improvement in their mechanical properties.

SUMMARY OF THE INVENTION

The present invention relates to a process for making a thermoplastic polyurethane material comprising the steps of casting an NCO-terminated prepolymer with 1,4-butanediol to a casting composition; extruding the casting composition to form strands of a polyurethane elastomer; pelletizing these strands of the polyurethane elastomer to form pellets; and processing these pellets to form polyurethane articles. The present invention also relates to a thermoplastic polyurethane material made from the aforementioned process.

DETAILED DESCRIPTION OF THE INVENTION

The present invention relates to a polyurethane comprising an NCO terminated prepolymer comprising the reaction of a polyisocyanate with an end-functionalized linear non-crosslinked polyolefin without pendant chain-branched groups, wherein the process for making such a polyurethane comprises the steps of casting the NCO-terminated prepolymer with 1,4-butanediol to form a casting composition. The prepolymer may also be casted with 1,3-propanediol, 1,3-butanediol, 1,6-hexanediol or other diols. Casting occurs at atmospheric pressure in a mold heated to between 50 to 120° C.

The casting composition is then extruded to form at least one strand of a polyurethane elastomer. Preferably, the extrusion occurs in an extruder, such as a single or twin-screw extruder. Most preferably, a twin screw extruder such as, for example, a Werner & Pfleiderer ZSK-V 53 mm extruder.

The strands of polyurethane elastomer are then pelletized in a pelletizer, such as, for example, any rotating blade pelletizer or a Cumberland 6" pelletizer. Finally, the pellets are further processed by injection molding in a Newbury 7 ton or any similar molding machine. The pellets may also be extruded, blow molded, blown into a film, and etc.

The polyolefin of the present invention is prepared by the reaction of a chain transfer agent with a cyclic olefin in the presence of a catalyst to form the desired polyolefin.

In particular, the polyolefin is a hydroxyl-functionalized polybutadiene (HFPB), which is made via the "Ring Opening Metathesis Polymerization" ("ROMP") process (Grubbs. et al., U.S. Pat. No. 5,750,815).

The synthesis of HFPB requires a chain transfer agent (CTA), which serves to add functionality (hydroxyl groups) to the polymer chain ends. The use of the CTA is dependent on the type of ROMP catalyst used. In the present invention, the most preferred chain transfer agent is 1,4-diacetoxy-2-butene. Accordingly, such a chain transfer agent is only useful with Ruthenium based metathesis catalysts and has a dramatic influence on the viscosity of the polybutadiene diol.

In the present invention, preferred cyclic olefins are cyclobutenes and cyclooctadienes and the most preferred cyclic olefin is 1,5-cyclo-octadiene, which is most preferably, reacted with 1,4-diacetoxy-2-butene in the presence of a catalyst to form the present HFPB. The HFPB, which results from this process, has the structure:

wherein n is a number average value of 1 to 1000.

The catalysts which can be used in the present invention and their preparation, are described in the patent assigned to the California Institute of Technology, Grubbs. et al. (U.S. Pat. No. 5,342,909). In a preferred embodiment, the catalyst required in the present invention is a Ruthenium metal carbene complex based compound. In a most preferred embodiment, the catalyst is bis(tricyclohexylphosphine) benzylidine-Ruthenium dichloride.

The polyolefins of the present invention have unique physical properties because of the linearity, unsaturation, functionality of 2.0, absence of crosslinking, low viscosity, low polydispersity and are capable of providing these properties to other polymeric compounds.

The HFPB polyolefin of the present invention has a viscosity ranging from 500 to 40,000 mPa·s, and most preferably from 800 to 16,000 mPa·s. The functionality of such a polyolefin ranges from 1.8 to 2.0 and most preferably is 2.0. The functionality is determined by titration and vapor phase osmometry. The number average molecular weight of the HFPB ranges from 196 to 200,000 g/mole and most preferably, from 1,500 to 6,500 g/mole.

A low viscosity prepolymer may also be prepared by the use of this polyolefin. These prepolymers, which may be used as the diisocyanate component in accordance with the present invention, are prepared from monomeric diisocyanates, and the polyolefin, HFPB, of the present invention.

The prepolymers of the present invention have an average functionality of 1.8 to 2.0, and most preferably 2.0. Additionally, the prepolymers preferably have an NCO content ranging from 3 to 20%, and most preferably 4 to 15%. Finally, the prepolymers preferably have a viscosity ranging from 500 to 20,000 mPa·s @ 25° C. and most preferably from 1000 to 10,000 mPa·s @ 25° C.

Suitable monomeric diisocyanates may be represented by the formula $$R(NCO)_2$$

in which R represents an organic group. The molecular weight of these diisocyanates is about 112 to 1,000, preferably about 140 to 400 and more preferably 174 to 300. Diisocyanates preferred for the process according to the present invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-iso-cyanatocyclohexyl)-methane, 2,4'-dicyclohexyl-methane diisocyanate, 1,3- and 1,4-bis-(isocyanatomethyl cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4-diisocyanatotoluene (and mixtures thereof with preferably up to 35 wt. %, based on the mixture of 2,6-diisocyanato-toluene), 4,4'-diphenylmethane diisocyanate (and mixtures thereof with 2,4'-diphenyl-methane diisocyanate and/or 2,2'-diphenyl-methane diisocyanate), 1,5-diisocyanato naphthalene and mixtures thereof.

Preferred organic diisocyanates include 1,6-hexamethylene diisocyanate, 1-isocyanato-3-isocyanatomethyl-3,5,5-trimethyl- cyclohexane (isophorone diisocyanate or IPDI), bis-(4-isocyanato-cyclohexyl)-methane, 1-isocyanato-1-methyl4(3)-isocyanatomethyl cyclohexane, 2,4- and/or 2,6-toluylene diisocyanate, and 2,4- diphenyl-methane diisocyanate. Most preferably, 4,4'-diphenylmethane diisocyanate and 4,4'-dicyclohexylmethane diisocyanate are used.

Of course, the prepolymer of the present invention may include catalysts, plasticizers, light stabilizers, heat stabilizers, lubricants, antioxidants and other additives.

The thermoplastic polyurethane of the present invention can be used to fabricate polyurethanes or polyurethane articles for use, for example, in elastomers, sealants, coatings, encapsulants, blown films, binders and sheets.

The invention is further illustrated but is not intended to be limited by the following examples in which all parts and percentages are by weight unless otherwise specified.

EXAMPLE

Example 1

A 7.0% NCO prepolymer was made with commercial material PolyBD R45M (2501 g) and MDI (997.2) and stirred overnight at 87° C. This prepolymer was then chain extended with 1,4-butanediol (252.5 g) at 90° C., poured into a mold, and cured overnight at 90° C. The resulting R45HT-based polyurethane was placed in a melt indexer at 205° C. with a weight on the barrel having a mass of 10 Kg. This polyurethane did not flow, but charred due to crosslinking present in the polyurethane.

Example 2

A 7.0% NCO prepolymer was made with HFPB (317.25 g) and MDI (130.50 g) and stirred overnight at 87° C. This prepolymer (326.6 g) was then chain extended with 1,4-butanediol (23.4 g) at 90° C., poured into a mold, and cured overnight at 90° C. The resulting plaques were soft and cheesy. The mechanical properties of this material could not be measured. This polyurethane was placed in a melt indexer at 205° C. with a weight on the barrel having a mass of 10 kg. This polyurethane flowed easily (MFI=8 g/10 min) under these conditions.

Example 3

The polyurethane made in Example 2 was cooled by placing in dry ice, then was ground in a mechanical grinder. After blending with Acrawax C as a processing aid, the material was extruded on a 1.5" single-screw extruder under the following conditions:

TABLE 1

| Extrusion Conditions. | |
|---|---|
| Zone 1, temperature, ° C. | 182 |
| Zone 2, temperature, ° C. | 182 |
| Zone 3, temperature, ° C. | 182 |
| Zone 4, temperature, ° C. | 193 |
| Screw Speed, rpm | 30 |

After cooling, the strands coming from the extruder were pelletized, and the pellets were injection molded into plaques, under the following conditions:

TABLE 2

| Injection Molding Conditions | |
|---|---|
| Zone 1, temperature, ° C. | 235 |
| Zone 2, temperature, ° C. | 235 |
| Zone 3, temperature, ° C. | 240 |
| Injection time, seconds | 10 |
| Overall cycle time, seconds | 45 |
| Injection pressure, psi | 130 |

After conditioning at ambient temperature, the following properties were measured on an injection molded plaque.

TABLE 3

| Mechanical Properties of Sample | |
|---|---|
| Tensile Strength, psi | 911 |
| Elongation, % | 196 |
| Elongation Set, % | 8 |
| Modulus at 100% Elongation, psi | 740 |
| Tear Strength, Die C, pli | 212 |
| Hardness, Shore A | 79 |
| Melt Flow Index, g/10 min. at 10 kg, 205 ° C. | 8 |

The poor physical properties of the cast polyurethane based on HFPB were drastically improved by extrusion. This improvement is not possible for the PolyBD R45 M materials since the functionality of these materials is greater than 2.0, and thus, they form crosslinked polyurethanes which do not flow under heat and pressure.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for making a thermoplastic polyurethane material comprising the steps of:
   a) casting an NCO-terminated prepolymer with 1,4-butanediol to form a casting composition wherein said NCO-terminated prepolymer comprises the reaction of a polyisocyanate with an end-functionalized linear non-crosslinked polyolefin without pendant chain-branched groups prepared by reacting 1,4-diacetoxy-2-butene with 1,5-cyclooctadiene in the presence of a catalyst comprising a ruthenium metal carbene complex followed by processing to form hydroxyls, characterized in that the functionality number of said polyolefin as determined by titration and vapor phase osmometry is 2.0 or less, and the viscosity of said polyolefin ranges from about 800 to 16,000 mPa·s @ 25° C. wherein said polyolefin has a molecular structure of

wherein n is a number average value of from 13 to 60;
   b) extruding said casting composition to form at least one strand of a polyurethane elastomer;
   c) pelletizing said at least one strand of said polyurethane elastomer to form at least one pellet; and
   d) processing said at least one pellet to form said thermoplastic polyurethane material.

2. A process according to claim 1, wherein said catalyst is bis-(tricyclohexylphosphine)benzylidine-ruthenium dichloride.

3. A process according to claim 1, wherein said prepolymer has a functionality of 2.0 or less, an NCO content ranging from 4 to 15 weight % and a viscosity ranging from about 500 to 20,000 mPa·s @25° C.

4. A process according to claim 1, wherein an extruder is used to extrude said casting composition to form at least one strand of a polyurethane elastomer.

5. A process according to claim 4, wherein said extruder is a single screw extruder.

6. A process according to claim 4, wherein said extruder is a twin screw extruder.

7. A process according to claim 1, wherein said processing is injection molding said pellets.

8. A process according to claim 1, wherein said processing is extruding said pellets.

9. A process according to claim 1, wherein said processing is film blowing said pellets.

10. A thermoplastic polyurethane material made from a process comprising:
   a) casting an NCO-terminated prepolymer with a diol to form a casting composition wherein said NCO-terminated prepolymer comprises the reaction of a polyisocyanate with an end-functionalized linear non-crosslinked polyolefin without pendant chain-branched groups prepared by reacting 1,4-diacetoxy-2-butene with 1,5-cyclooctadiene in the presence of a catalyst comprising a ruthenium metal carbene complex followed by processing to form hydroxyls, characterized in that the functionality number of said polyolefin as determined by titration and vapor phase osmometry is 2.0 or less, and the viscosity of said polyolefin ranges from about 800 to 16,000 mPa·s @ 25° C. wherein said polyolefin has a molecular structure of

wherein n is a number average value of between 13 to 60;
   b) extruding said casting composition to form at least one strand of a polyurethane elastomer;
   c) pelletizing said at least one strand of said polyurethane elastomer to form at least one pellet; and
   d) processing said at least one pellet to form said thermoplastic polyurethane material.

11. A thermoplastic polyurethane material according to claim 10, wherein said polyisocyanate in MDI.

12. A thermoplastic polyurethane material according to claim 10, wherein said catalyst is bis-(tricyclohexylphosphine)benzylidine-ruthenium dichloride.

13. A thermoplastic polyurethane material according to claim 10, wherein said diol is 1,4-butanediol.

14. A thermoplastic polyurethane material according to claim 10, wherein said diol is 1,4-butanediol and said polyisocyanate is MDI.

15. A thermoplastic polyurethane material according to claim 10, wherein said processing is injection molding said pellets.

16. A thermoplastic polyurethane material according to claim 10, wherein said processing is extruding said pellets.

17. A thermoplastic polyurethane material according to claim 10, wherein said processing is film blowing said pellets.

* * * * *